United States Patent [19]
Mainord

[11] Patent Number: 5,826,520
[45] Date of Patent: Oct. 27, 1998

[54] APPARATUS AND PROCESS FOR HIGH TEMPERATURE CLEANING OF ORGANIC CONTAMINANTS FROM FRAGILE PARTS IN A SELF-INERTING ATMOSPHERE AT BELOW THE TEMPERATURE OF COMBUSTION

[75] Inventor: Kenneth R. Mainord, Dallas, Tex.

[73] Assignee: Tempyrox Company, Inc., Dallas, Tex.

[21] Appl. No.: 688,383

[22] Filed: Jul. 30, 1996

[51] Int. Cl.⁶ .................................. F23B 7/00; F23B 5/00; B09B 3/00
[52] U.S. Cl. .......................... 110/342; 110/345; 110/346; 110/236; 110/210; 110/214
[58] Field of Search .................................... 110/236, 248, 110/250, 210, 211, 212, 213, 214, 346, 345, 342; 134/5, 19, 21

[56] References Cited

U.S. PATENT DOCUMENTS

| | | |
|---|---|---|
| Re. 33,077 | 10/1989 | Van Dewoestine ...................... 110/203 |
| 3,068,812 | 12/1962 | Hemeon . |
| 3,509,834 | 5/1970 | Rosenberg et al. . |
| 3,530,805 | 9/1970 | Bowman ...................................... 110/7 |
| 3,544,367 | 12/1970 | Ehrlich ........................................ 134/2 |
| 3,548,762 | 12/1970 | Anderson .................................... 110/18 |
| 3,808,619 | 5/1974 | Vanderveer ............................... 110/8 C |
| 3,839,086 | 10/1974 | Larson ........................................ 134/19 |
| 3,936,659 | 2/1976 | Mainord .................................. 219/413 |
| 4,032,361 | 6/1977 | Eriksson et al. ........................... 134/19 |
| 4,057,438 | 11/1977 | Mainord ...................................... 134/2 |
| 4,220,480 | 9/1980 | Dwan ............................................ 134/5 |
| 4,233,496 | 11/1980 | Weber ....................................... 219/390 |
| 4,270,898 | 6/1981 | Kelly ........................................... 432/19 |
| 4,437,451 | 3/1984 | Wysong .............................. 110/214 X |
| 4,479,921 | 10/1984 | Allaire et al. ....................... 110/211 X |
| 4,557,203 | 12/1985 | Mainord .................................. 110/344 |
| 4,649,834 | 3/1987 | Heran et al. ............................ 110/190 |
| 4,759,298 | 7/1988 | Koptis et al. ........................... 110/190 |
| 4,827,855 | 5/1989 | Koptis et al. ........................... 110/214 |
| 4,986,198 | 1/1991 | Naito et al. ............................. 110/346 |
| 5,018,458 | 5/1991 | McIntyre et al. ........................ 110/346 |
| 5,189,963 | 3/1993 | Mann ....................................... 110/190 |
| 5,193,468 | 3/1993 | McRae .................................... 110/235 |
| 5,351,632 | 10/1994 | Mann ....................................... 110/190 |
| 5,363,777 | 11/1994 | Yoshimoto et al. ..................... 110/214 |

OTHER PUBLICATIONS

Kenneth R. Mainord et al., "Cleaning with Heat", Products Finishing, pp. 125–129, Jun. 1992.
Kenneth R. Mainord; Dallas, Texas. a two-page advertising pamphlet entitled: "Solvent-Free Cleaning of Asphalt from Lab Glassware"—The Pyro-Clean Unit by *Tempyrox Company Cleaning Systems* Dallas, Texas 75229–3650 Jan. 1996.
Kenneth R. Mainord; Handbook entitled: "Installation, Operation, Maintenance Manual—Pyro-Clean System—Model 3-AB" by *Tempyrox Company* 11055 Dennis Rd #4 Dallas, Texas 75229–3650 Marathon Oil Co., Detroit, MI Feb. 20, 1996.
Kenneth R. Mainord; a two-page advertising pamphlet entitled: "Asphalt Laboratories! New Technology! Solvent-Free cleaning of asphalt from Laboratory Glassware!—Two Bench-Top Models Meet Needs of most Labs" by Tempyrox Company, Inc. Dallas, Texas 75229–3650 Jan. 1996.

*Primary Examiner*—Ira S. Lazarus
*Assistant Examiner*—Ljiljana V. Ciric
*Attorney, Agent, or Firm*—Charles C. Garner

[57] ABSTRACT

An apparatus and process are provided for non-combustion, high-temperature cleaning of organic contaminants from fragile parts which are resistant to heat below the temperature of combustion but which may not be resistant to burning or heat above the temperature of combustion, by pyrolysis in a self-inerting atmosphere not supporting combustion, and by oxidization at a controlled temperature below the temperature of combustion for the contaminants preventing fires, explosions, and difficult-to-control temperature variations, with means for removing smoke and fumes from effluent gases, and equivalently for cleaning non-fragile, heat resistant parts as well.

10 Claims, 9 Drawing Sheets

FRONT VIEW

ISO VIEW (1) CONTROL BOX COVER REMOVABLE TO ACCESS CONTROLS.
(2) ELECTRI-CAT OXIDIZER ENCLOSURE.
(3) INSIDE CLEANING COMPARTMENT DIMENSIONS: 15"W. X 16"T. X 18"D.
(4) OVERALL HEIGHT OF OVEN WITH DRAFT INDUCER INSTALLED IS 59".

GENERAL LAYOUT

APPARATUS AND PROCESS FOR HIGH TEMPERATURE CLEANING OF ORGANIC CONTAMINANTS FROM FRAGILE PARTS IN A SELF-INERTING ATMOSPHERE AT BELOW THE TEMPERATURE OF COMBUSTION

TECHNICAL FIELD

This invention relates to the technology of cleaning with heat, commonly known as thermal cleaning by pyrolysis and oxidization.

BACKGROUND OF THE INVENTION

The technology of cleaning with heat has existed for many years and has been practiced in commercial sales of both consumer and industrial products. One successful, consumer product is the self-cleaning oven which operates on the simple principle of using heat to clean the oven interior when it becomes dirty or contaminated from baked-on food spills or grease splattering. The self-cleaning oven cycle is initiated by bringing the oven temperature up to about 750 to 950 degrees F., substantially higher than the normal cooking temperatures of 250 to 550 degrees F. The high temperature of the self-cleaning cycle is normally maintained for a suitable time period, usually 1 to 2 hours, to remove the baked-on organic residues by a combined action of vaporization, thermal decomposition, and oxidation. The gaseous products are generally exhausted through a small catalytic oxidizing unit before being discharged to the atmosphere. Any residue remaining on the interior walls of the oven is normally a soft ash, removable with a wet rag or sponge. The danger of fire or explosion in normal operation of a self-cleaning oven is negligible primarily due to the fact that the volume of combustible pyrolysis smoke and gases emitted is small and the concentration of combustible material in the oven interior and exhaust stream never attains an explosive or ignitable level.

In contrast, fires and explosions have occurred more frequently in early versions of thermal cleaning equipment used in industrial environments. For industrial cleaning problems, the so-called burn-off or reclamation furnaces were among the first widespread applications of thermal cleaning principles to remove combustible or other organic material from metal, glass, or ceramic parts. Burn-off furnaces have been accepted and used by industry because they offer a simple economical way to solve many industrial cleaning problems. However, along with their use, such ovens in some cases developed a pattern of poor performance and danger because of occasional fires or explosions associated with their normal use.

Originally, burn-off or reclamation furnaces or ovens did not include much more than a heated, vented chamber into which contaminated parts were loaded and heated to temperatures of 800 to 1000 degrees F. As the temperature of the parts became elevated on heating, the organic contaminants on the parts decomposed to combustible smoke and vapors. In cases where the amount of combustible gases became excessive or the heat-up rate was too fast and venting of the combustible gases inadequate, frequently the combustible gases would evolve at such a high rate to ignite, burn, or explode. Normally fires and explosions occurred where the emission rate of the volatile, combustible pyrolysis smoke and gases from the parts became greater than the enclosure or chamber holding the parts, or the venting equipment handling the fumes, could handle, and an explosive mixture resulted. Fires or explosions resulted in warping of the parts, damage to the cleaning chamber, and exposure of employees to dangerous, unsafe situations.

DESCRIPTION OF PRIOR ART

Over many years various improvements have been made in the design and operation of thermal cleaning equipments such as burn-off or reclamation ovens or furnaces used to remove organic residues from valuable objects which needed to be cleaned. U.S. Pat. No. 3,839,086 to Larson discloses the method of injecting water spray or vapor into a rotary furnace used to remove oil residues from metal scrap or turnings generated during metal-working operations. The evolution of the oil in the form of combustible vapors initiated a combustion reaction which was highly exothermic. Several water spray nozzles were activated in response to a temperature sensor in the furnace/dryer, and successively to the activation of a cam-type arrangement to supply enough water spray to control the exothermic oxidation or burning of the oil. U.S. Pat. No. 3,544,367 to Ehrlich and Thomas discloses the use of both oil and water injection to control the combustion or oxidation reaction recurring in a metal scrap dryer. Both of the referenced patents disclose water injection as a means of controlling the highly exothermic reaction of thermal removal of the oil from heat supplied by fuel-fired burners.

U.S. Pat. No. 4,270,898 to Kelly discloses an automatic control system for a burn-off/reclamation furnace which comprises an automatic means for sensing the level of combustible pyrolysis smoke and gases emitted from the contaminated parts, coupled with a water injection system responsive to the smoke emission sensor system to cool the furnace interior and parts, thereby maintaining the emission rate of combustible gases at safe levels. By injection of water vapor to control the emission rate and help inert the furnace atmosphere, the furnace could be operated safely without excessive fires or explosions. One inherent deficiency of the Kelly method was allowing the heat input burner of the furnace to cycle on and off to maintain the temperature setpoint of the cleaning process. During the off cycle of the burner, air can leak through the burner into the furnace chamber increasing the oxygen content and resulting in possible fires and explosions. U.S. Pat. No. 4,057,438 to Mainord discloses use of inert gas to purge the oven chamber, means for detecting failure of the inert gas source, means for detecting combustible gas mixtures, and means for sensing overheating or rapid temperature change. U.S. Pat. No. 4,557,203 to Mainord discloses an improved method for control of a burn-off furnace which did not allow the heat input burner to cycle off, which controls the heat input burner at a fuel/air ratio which helped inert the furnace chamber, and used multiple, independent water spray systems responding both to variations in the furnace temperatures and the temperature of the gas-fired afterburner used to burn the pyrolysis smoke and gases emitted from the primary furnace chamber. U.S. Pat. No. 4,649,834 to Heran et al disclosures further improvements to the control gas-fired burn-off furnaces using water spray systems responsive to multiple, sensing thermocouples place in both the furnace and afterburner chambers.

For cleaning most metal parts, burn-off furnaces or ovens controlled with water spray is an accepted and desirable method. However, for thermal cleaning of more fragile non-metal parts such as laboratory glassware, thermal cleaning systems which use water spray injection are not suitable because of the possibility of breaking the glassware. More suitable thermal cleaning systems have been disclosed. One such system is revealed in U.S. Pat. No. 3,936,659 to Mainord. This patent discloses an electrically heated high temperature oven which employs an inert gas such as nitrogen to control the oven atmosphere to completely eliminate danger of fire or explosion, and utilizes a two stage pyrolysis-oxidation methodology in said inert gas atmosphere to carry out the cleaning process. Pollution control of the smoke emitted from the cleaning process was not addressed in the Mainord patent. Additionally, the cleaning equipment revealed in the Mainord patent tended to operate at very slightly positive pressures in the pyrolysis chamber or oven, resulting in leakage of smoke from around the gaskets into the room or environment where the cleaning chamber was located. U.S. Pat. No. 4,233,496 to Weber et al. reveals a two stage pyrolysis-oxidation method for cleaning plastics from metal parts such as extrusion or molding machine screws. The Weber patent uses an electrically heated, sealed chamber where the screw is heated in the absence of air, and a vent system for emitting the pyrolysis smoke to a gas burner for pollution control of the fumes from the cleaning process. U.S. Pat. No. 4,220,480 by Dwan reveals yet another method for pyrolytic cleaning of organic residues from parts utilizes a high temperature vacuum oven operating at typical thermal cleaning temperatures of 800 to 1000 degrees F. This system uses the simple method of drawing a vacuum on the pyrolysis chamber to eliminate any air or oxygen, thus completely eliminating any danger of ignitions, fires, or explosions during the thermal cleaning process. This method, though simple in concept, is more expensive in actual practice, and commercial systems built on the vacuum principle are generally orders of magnitude more expensive than atmosphere ovens or furnace designs. This methodology becomes almost prohibitively expensive in large systems because of the costly, structural design and engineering required to build high temperature vacuum systems for cleaning purposes.

Other art in this field includes U.S. Pat. No. 4,759,298 to Koptis et al, for incinerating high-polymer loads, which uses single water spray actuated by signal from temperature sensing device to maintain controlled temperature in main furnace chamber. U.S. Pat. No. 4,827,855 to Koptis et al, for burning organic combustibles, uses ramp and soak temperature profile, and actuation of a single water spray to attenuate and control temperature and output of main chamber. U.S. Pat. No. 4,986,198 to Naito, in a bed incinerator, detects and controls rate of combustion by reducing and restoring amount of air fed from a lower portion of the furnace. U.S. Pat. No. 5,018,458 to McIntyre discloses method for controlling combustion zone temperature independent of flue gas oxygen by supplying a fine mist of liquid water droplets to the combustion zone. U.S. Pat. No. 5,189,963 to Mann discloses a method of temperature control of combustible atmosphere furnace by monitoring temperature and rate of change thereof, compared to a previously determined safe rate of change. U.S. Pat. No. 5,351,632 to Mann discloses cleaning parts by pyrolytic burn off, fired by primary burner wherein combustion chamber comprises upper portion for heating from the top downwardly and a lower portion for exhausting volatile constituents, and the combustion gases with pyrolized volatile constituents are withdrawn from the lowermost portion of the chamber.

SOME ASPECTS OF THE INVENTION

Accordingly, the present invention is directed to overcoming the inherent problems and deficiencies of prior art systems. A major aspect of the present invention involves eliminating the necessity to inert the cleaning chamber with inert gases such as nitrogen, argon, or steam. A second important aspect of the present invention is the operation of the pyrolysis oven/chamber under slight negative pressures of −0.02 to −0.10 inches water column to eliminate any chance of leakage of smoke from the system into the room or environment where the cleaning system is located. Another important aspect of the present invention is an improved pyrolysis-oxidation equipment and process for thermal cleaning of fragile parts such as laboratory glassware, the method inherently being also suitable for more rugged parts such as metal or ceramic pieces. Another important aspect of this invention is an improved catalytic oxidization method for pollution control of the smoke generated during the cleaning process.

Another important aspect of this invention is an automatic cleaning cycle control feature which adjusts the oven cleaning process to the load placed in the oven. The more organic contaminates or polymers on the parts to be cleaned, the more smoke that will be evolved off the parts during the thermal cleaning process. In this invention, the oxidizer is equipped with a sensor and controller which controls the heatup rate of the oven to prevent the oxidizer from being overwhelmed by too much smoke. Thus controlled by the oxidizer sensor, the oven seeks whatever oven temperature is necessary to produce the optimum amount of smoke the oxidizer can process, but no more than it can handle.

SUMMARY OF THE INVENTION

The present invention comprises an electrically heated, self-inerting cleaning chamber used to thermally remove organic residues from glass, metal, ceramic, or other heat-resistant parts. The cleaning process is carried out under slight negative pressures of −0.02 to −0.10 inches water column, and uses a combination of pyrolysis in an inert, or low oxygen atmosphere, followed in a later cycle by addition of air or oxygen necessary to oxidize and remove any carbonaceous residues created during the pyrolysis stage of the cleaning process. Self-inerting of the cleaning chamber is achieved by placing a sufficient quantity of catalytic pellets or other catalyst media inside the chamber to react with pyrolysis smoke and gases which are initially produced during the heating of the organic residues to temperatures which degrade and vaporize the organic materials. As the pyrolysis (cleaning) chamber is heated, the catalyst will become active at about 500 to 550 degrees F. At or above these same temperatures, most organic materials begin to thermally pyrolyze or oxidatively degrade to produce smoke and fumes inside the chamber. With a generous amount of catalytic agent present in the pyrolysis chamber, the smoke and fumes catalytically oxidize, reacting with and consuming any oxygen or air initially present inside the cleaning chamber, or any air which leaks into, infiltrates, and is drawn into the cleaning chamber in the duration of the cleaning process. In effect, the cleaning chamber "self-inerts" itself during heatup to process temperature (typically 800 to 900 degrees F.), while at the same time catalyzing the draft influx of a slight amount of air during set temperature cleaning to accommodate movement of the pyrolysis gases into the catalytic oxidizer chamber as will be explained below. This self-inerting process eliminates the necessity to purge the pyrolysis chamber with inert gases such as nitrogen, argon, steam, and carbon dioxide, and without having to operate the cleaning chamber under a high vacuum to exclude oxygen or air, moreover, the slight negative pressure (draft) under which the system operates during cleaning eliminates any chance of pyrolysis smoke and gases from the pyrolysis or oxidizer chamber from escaping the process and entering the room or environment where the equipment is located.

For removing the smoke and fumes, this invention embodies a novel combination of electric, catalytic, and gas burner technologies into a small, compact oxidizer design for destroying the pyrolysis smoke and gases generated during the cleaning process. The oxidizer chamber sits on top of the main oven chamber and is connected a by stainless steel pipe. The connecting pipe is fitted with a small stainless steel tubing used to inject small amounts of air into the connecting pipe, allowing the smoke from the pyrolysis chamber and the air to be mixed, essentially creating a small gas burner when sufficient amounts of smoke are generated for ignition and burning to occur. The oxidizer chamber is well-insulated for typical operation in the range of 1300 to 1800 degrees F., and contains an opening to pull in air, electric heaters to heat the air to 1000 to 1300 degrees F., a ceramic honeycomb catalyst to oxidize the smoke/air mixtures and an exit port for the exhaust gases. The exhaust gases are pulled into a draft inducer which mixes the hot oxidizer exhaust gases with cool air and lowers the exhaust stream from temperatures above 1000 degrees F. to temperatures of about 150 degrees F. The reduced temperature of the exhaust stream allows the use of inexpensive, common Class B vent pipe, rather than special, high temperature, insulated vent stack.

BRIEF DESCRIPTION OF THE DRAWINGS

The features and disclosure of the present invention will be understood by reading the Detailed Description set forth below in conjunction with the drawings in which.

DETAILED DESCRIPTION OF THE PREFERRED EMBODIMENT

Figure 1:
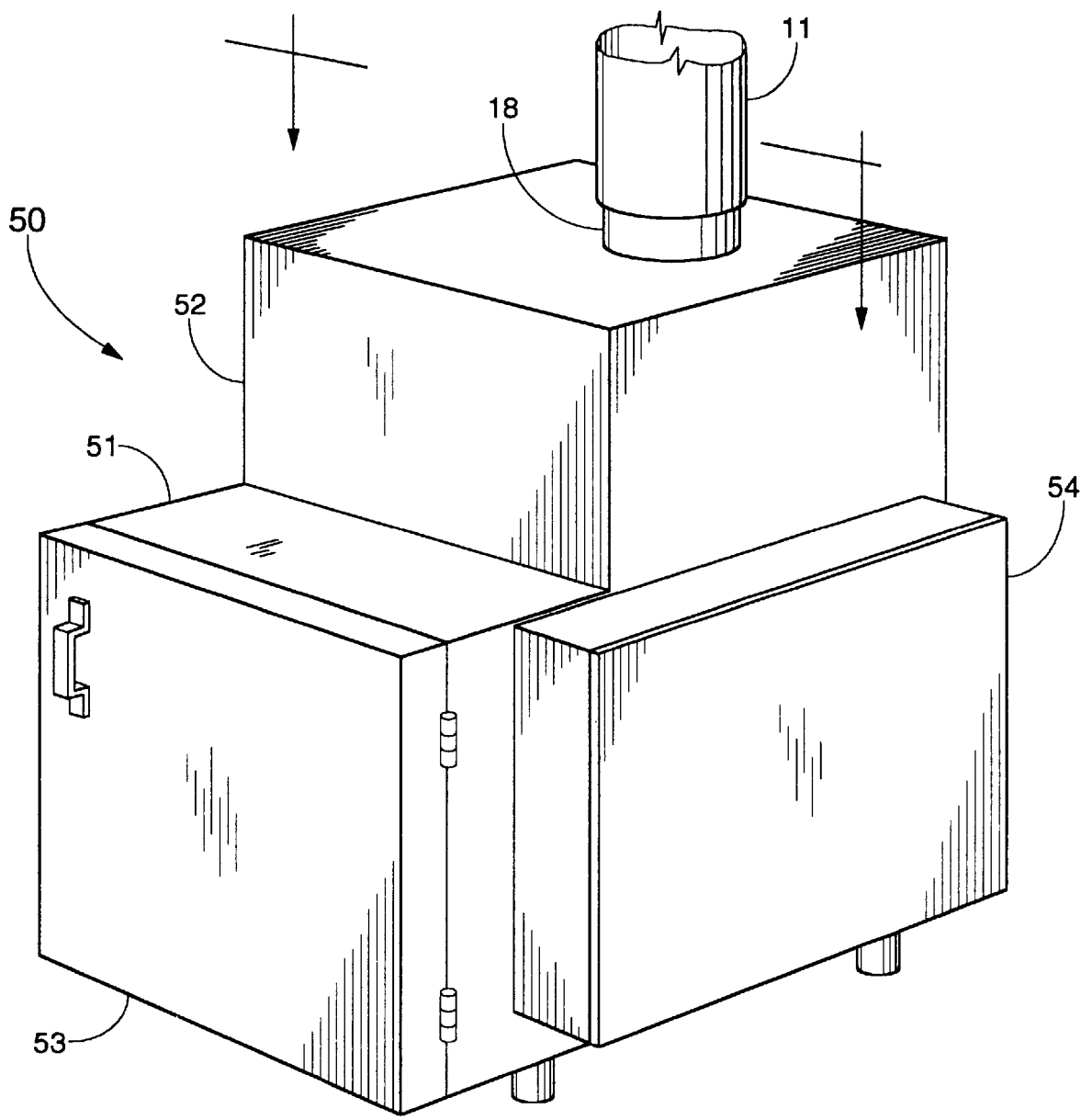
FIG. 1 is a perspective view of the oven console 50 assembly of this invention showing the pyrolysis chamber 51, the oxidizer chamber 52, the oven door 53, the control panel 54 cabinet, and the draft inducer 11, as an overall view of the invention.

To follow this description, please refer to the drawings wherein like reference numbers designate like or corresponding parts throughout the several views. Number and nomenclature of components shown in the drawings are listed and described as follows:

| NUMBER | NAME/DESCRIPTION |
|---|---|
| 1 | PYROLYSIS OVEN CHAMBER (separate, well insulated, heated oven; internal, useable dimensions of about 20 inches cubed - designed to be tightly sealed, utilizing dual gasketing to achieve a tight seal and low leakage rate of air into the chamber) |
| 2 | OXIDIZER COMBUSTION CHAMBER (circular, about 5 inches in diameter and about 24 inches long, inside dimensions) |
| 3 | PYROLYSIS CHAMBER HEATER ELEMENTS (inconel, sheathed; typically operated at temperatures of 800 to 1,000° F., preferably at 900°) |
| 4 | OXIDIZER CHAMBER HEATER ELEMENTS (nichrome) |
| 5 | OVEN FRONT DOOR, dual-gasketed (not shown) |
| 6 | SHELVES (alternately stainless steel baskets) for holding items to be cleaned |
| 7 | DRIP PAN (stainless steel - sits on bottom of chamber to collect molten organic matter which drips from the object being cleaned during cleaning process, which may solidify when cooled) |
| 8 | OVEN TRAYS (also called SPECIAL TRAYS, constructed of perforated metal such that ceramic catalytic beads (shown at 49 are part of the tray design, which are a critical part of the invention, and serve to consume any initial oxygen present in the oven chamber 1 by catalyzing the oxygen reaction between pyrolysis smoke and gases produced during the initial heatup to cleaning temperature set-point. Thus catalytic oxidization results in "self-inerting" of the oven chamber as the oven temperature rises above about 600° F.) |
| 9 | AIR INLET HOLE (in oxidizer chamber) to allow air to be pulled into the heater section (10) of the oxidizer |
| 10 | HEATER SECTION OF THE OXIDIZER CHAMBER |
| 11 | DRAFT INDUCER (connected to the oven exhaust 18 (for three functions: supplying negative pressure draft for drawing air into oxidizer chamber 2 and into the pyrolysis chamber 1; cooling the hot oxidizer exhaust gases for exhausting and exhausting them; and supplying a flow of cooling air between the oven insulation 13 (and 16) and the outer metal skins or panels 14 of the oven console 50. |
| 12 | CONNECTING PIPE (connecting the pyrolysis chamber 1 and the oxidizer chamber 2 - both chambers operate at basically the same draft. |
| 13 | OVEN INSULATION of the pyrolysis oven chamber. |
| 14 | OUTER METAL SKINS (or panels) of the pyrolysis oven console. |
| 15 | AIR INJECTION TUBING - approximately ¼ inch, connected to Small Air Pump 48 for injecting compressed air into Connecting Pipe 12 - air must be injected into Connecting Pipe 12, in the direction of flow from the Pyrolysis Chamber 1 to the Oxidizer Chamber 2 - this air injection creates a small venturi and mixing effect in the pipe, effectively creating a small gas burner when sufficient amount of pyrolysis smoke and gases exit Connecting Pipe 12. |
| 16 | OVEN INSULATION of the oxidizer (combustion) oven chamber 2. |
| 17 | CERAMIC HONEYCOMB CATALYST, as present in Oxidizer Chamber 2. |
| 18 | Oxidizer exhaust pipe. |
| 19 | Oven temperature sensing device. |
| 20 | HEATERS ON INDICATOR LAMP |
| 21 | PYROLYSIS CHAMBER TEMPERATURE CONTROLLER, also called UNIT TEMPERATURE CONTROLLER, and also called OVEN CHAMBER TEMPERATURE CONTROLLER. |
| 22 | OXIDIZER TEMPERATURE CONTROLLER. |
| 23 | CYCLE STARTED INDICATOR. |
| 24 | START CYCLE SWITCH, also called MOMENTARY START BUTTON. |
| 25 | POWER SWITCH. |
| 26 | STOP/RESET SWITCH. |
| 27 | CR7 CYCLE TIMER RELAY |
| 28 | CR2 START LATCH RELAY. |
| 29 | CR4 BLOWER MOTOR OFF TIME DELAY OFF SYRELEC. |
| 30 | CR5 RAMP SOAK COUNTER RELAY, also called 0–99 COUNTER RELAY. |
| 31 | CR6 UNIT ALARM 2 AUXILIARY RELAY. |
| 32 | CR3 UNIT TIME DELAY ON RELAY SYRELEC. |
| 33 | CR8 CYCLE TIMER DELAY RELAY SYRELEC. |
| 34 | CR1 COOLING FAN RELAY. |
| 35 | CR12 OXIDIZER ALARM 1 AUX. RELAY, also called ALM 1. |
| 36 | CR13 OXIDIZER ALARM 2 AUX. RELAY. |
| 37 | DOOR LOCK SOLENOID and DOOR LOCK SOLENOID BOLT. |
| 38 | AIR FLOW 3-WAY SOLENOID VALVE - (alternately, THREE WAY SOLENOID VALVE) switches the air stream (from Air Injection Tubing 15) furnished by Air Pump 48 from the Connecting Pipe 12 into the Oxidizer Chamber 2, |

-continued

| NUMBER | NAME/DESCRIPTION |
|---|---|
|  | switched to an Oven Air Inlet Pipe 47 connected into the Pyrolysis Chamber 1, for a timed period at 800 to 1,000° F., and thereafter the parts, or items, or objects to be cleaned are free of carbon residues, and the cleaning system automatically shuts down, and cools down, so the cleaned parts can be unloaded, and the controls reset, ready for another cleaning cycle. This Solenoid Valve 38 is connected to Air Pump 48. |
| 39 | AIR PUMP and AFTERBURNER AIR PUMP. |
| 40 | HIGH LIMIT TEMPERATURE CONTROL. |
| 41 | CLEANING UNIT CONTROL BOX, also called SYSTEM CONTROL BOX. |
| 42 | MANOMETER. |
| 45 | VISIBLE FLAME (has many of the characteristics of a typical flame produced by a nozzle-mix burner, including audible noise) (appears that majority of the burning/oxidization of the VOC's occurs in the flame and its outer boundaries before reaching the honeycomb catalyst in the Oxidizer Chamber 2. |
| 46 | Temperature sensing device for oxidizer combustion chamber. |
| 47 | OVEN (pyrolysis) AIR INLET PIPE (to Solenoid Valve 38). |
| 48 | SMALL AIR PUMP (alternately a compressed air source 48). |
| 49 | CERAMIC CATALYTIC BEADS, which catalyze the oxygen reaction between pyrolysis smoke and gases produced during the initial heatup to cleaning temperature set-point and during pyrolytic decomposition. |
| 50 | OVEN CONSOLE (oven assembly, complete). |
| 51 | PYROLYSIS CHAMBER. |
| 52 | OXIDIZER COMBUSTION CHAMBER. |
| 54 | CONTROL PANEL. |
| (not shown) | VOLATILE ORGANIC COMPOUNDS ("VOC's") (also referred to as the pyrolysis smoke and gases). |

Figure 2:
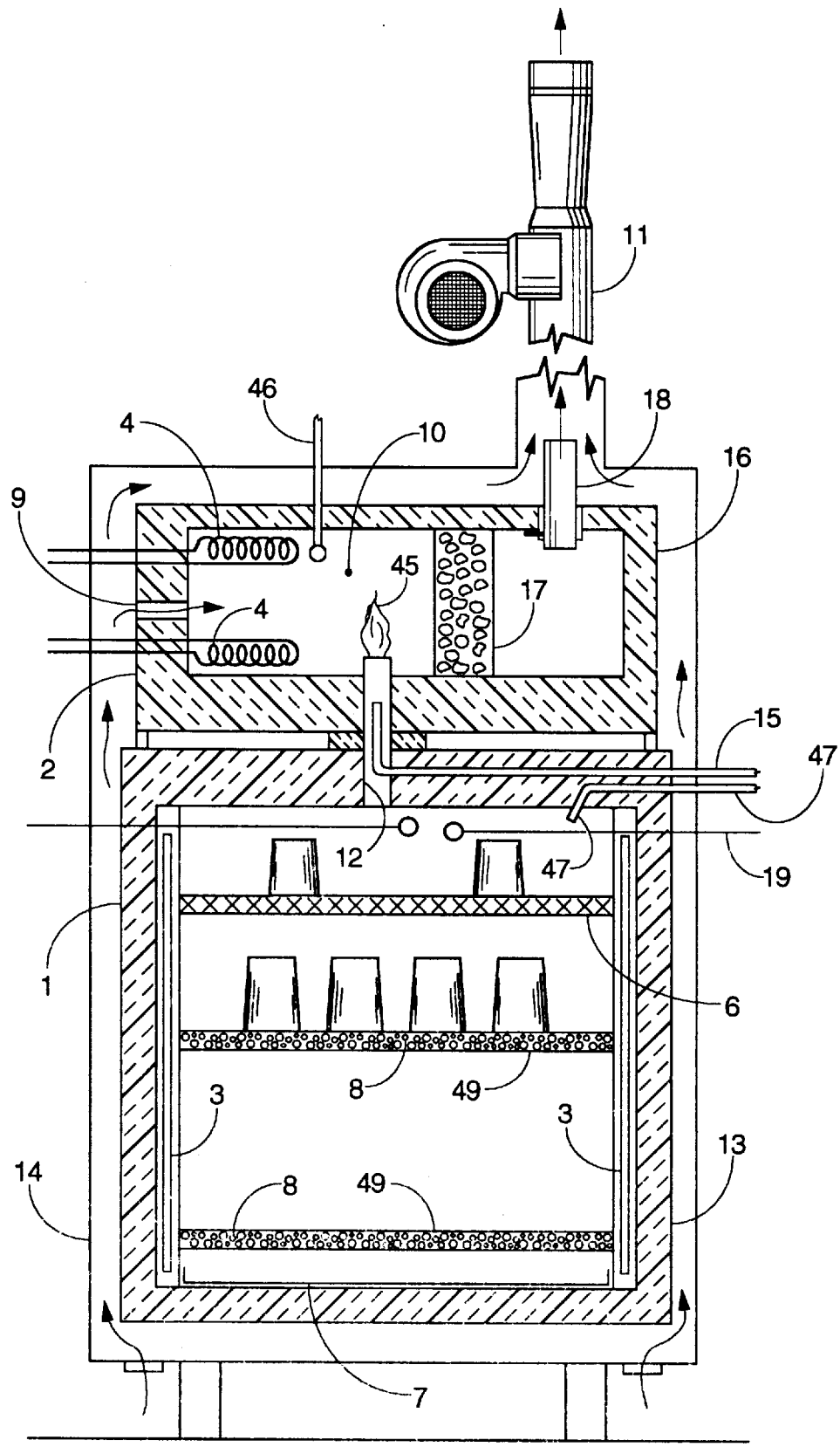
FIG. 2 is a cut-away interior view showing main components within the pyrolysis oven chamber 1 and the oxidizer combustion chamber 2, with detail components.
Figure 3:
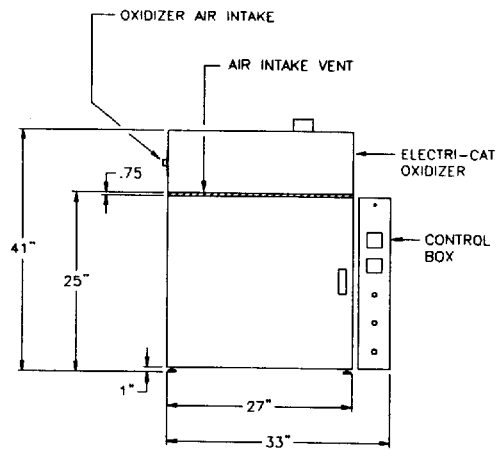
FIG. 3 is a general layout ISO view and front view of the oven console assembly of this invention.
Figure 3:
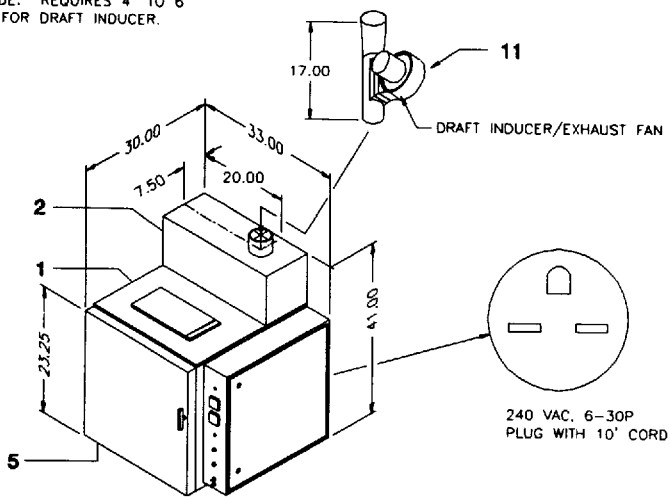
Figure 4:
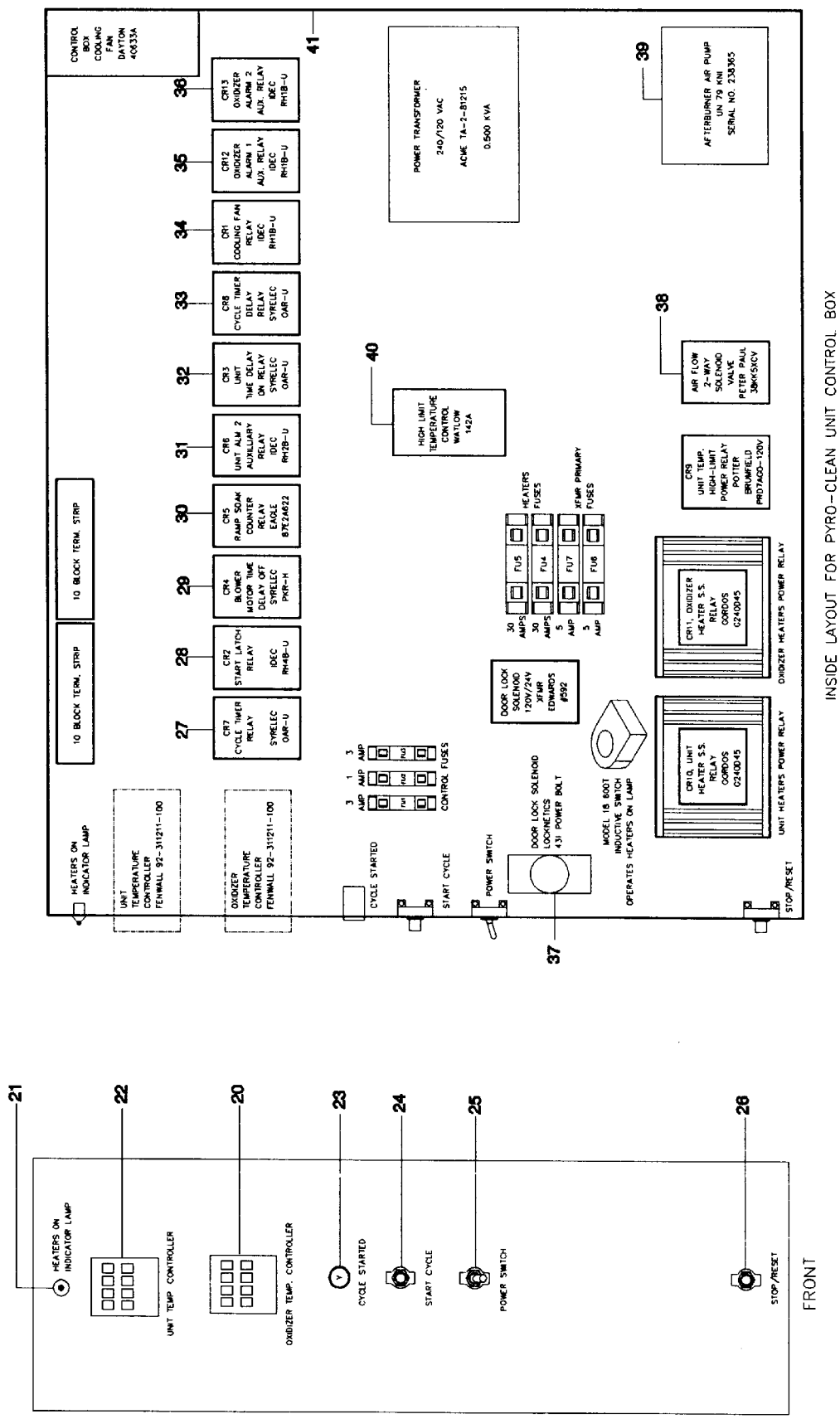
FIG. 4 is a control box layout, showing the main operating controls.
Figure 5:
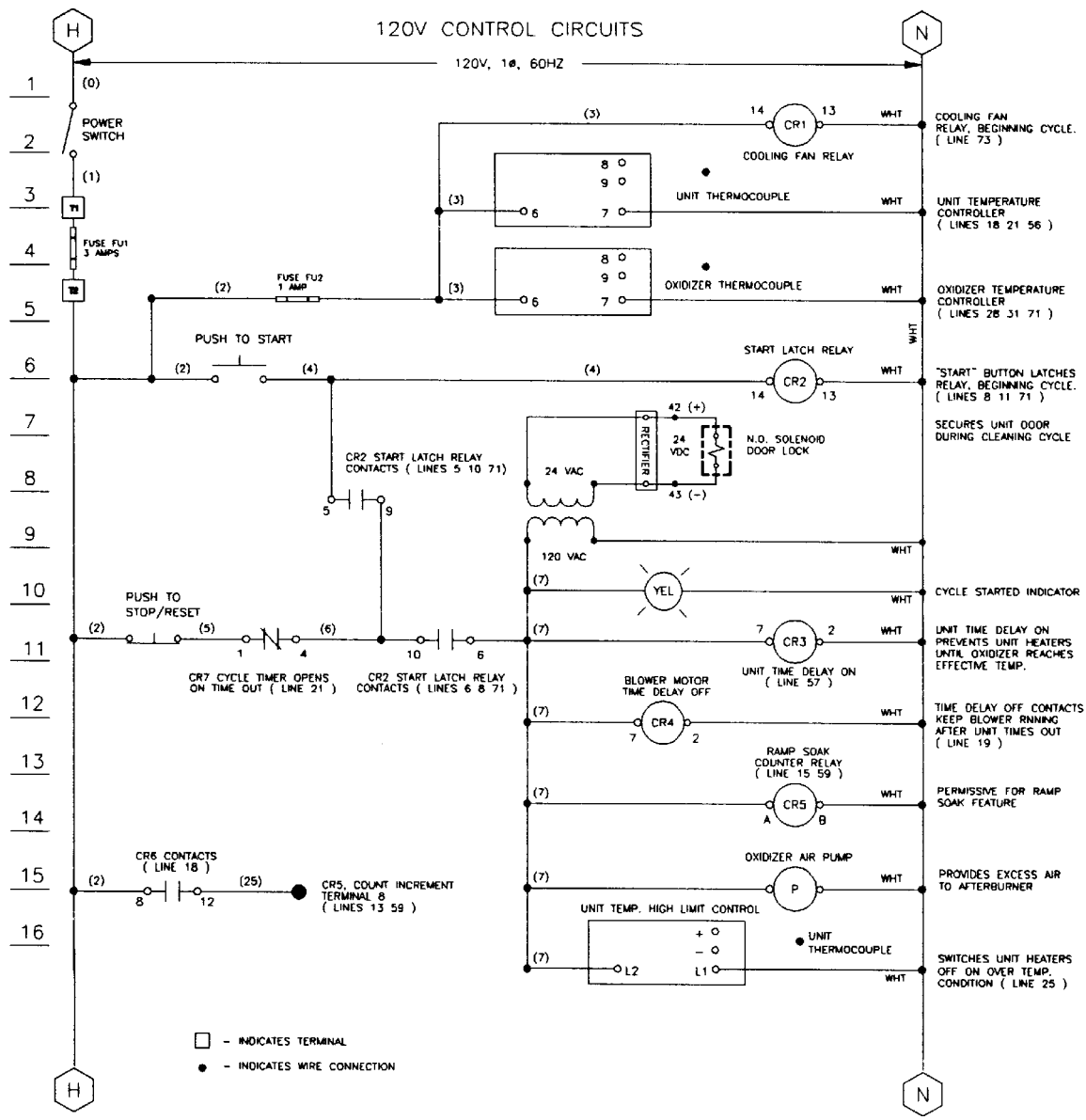
FIGS. 5, 6, and 7 are wiring diagrams (sheets 1, 2, and 3) of controls and operating components.
Figure 6:
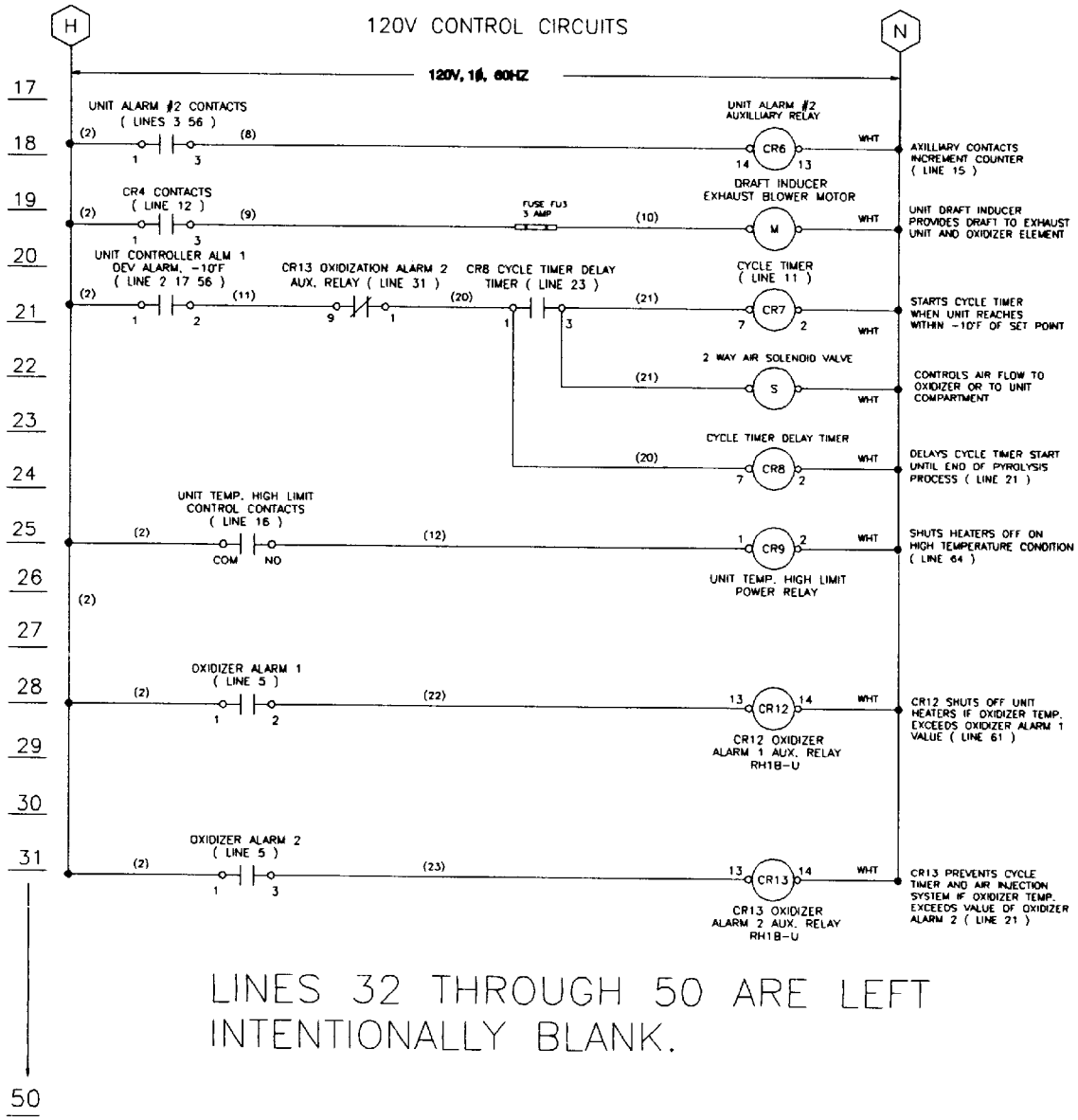
Figure 7:
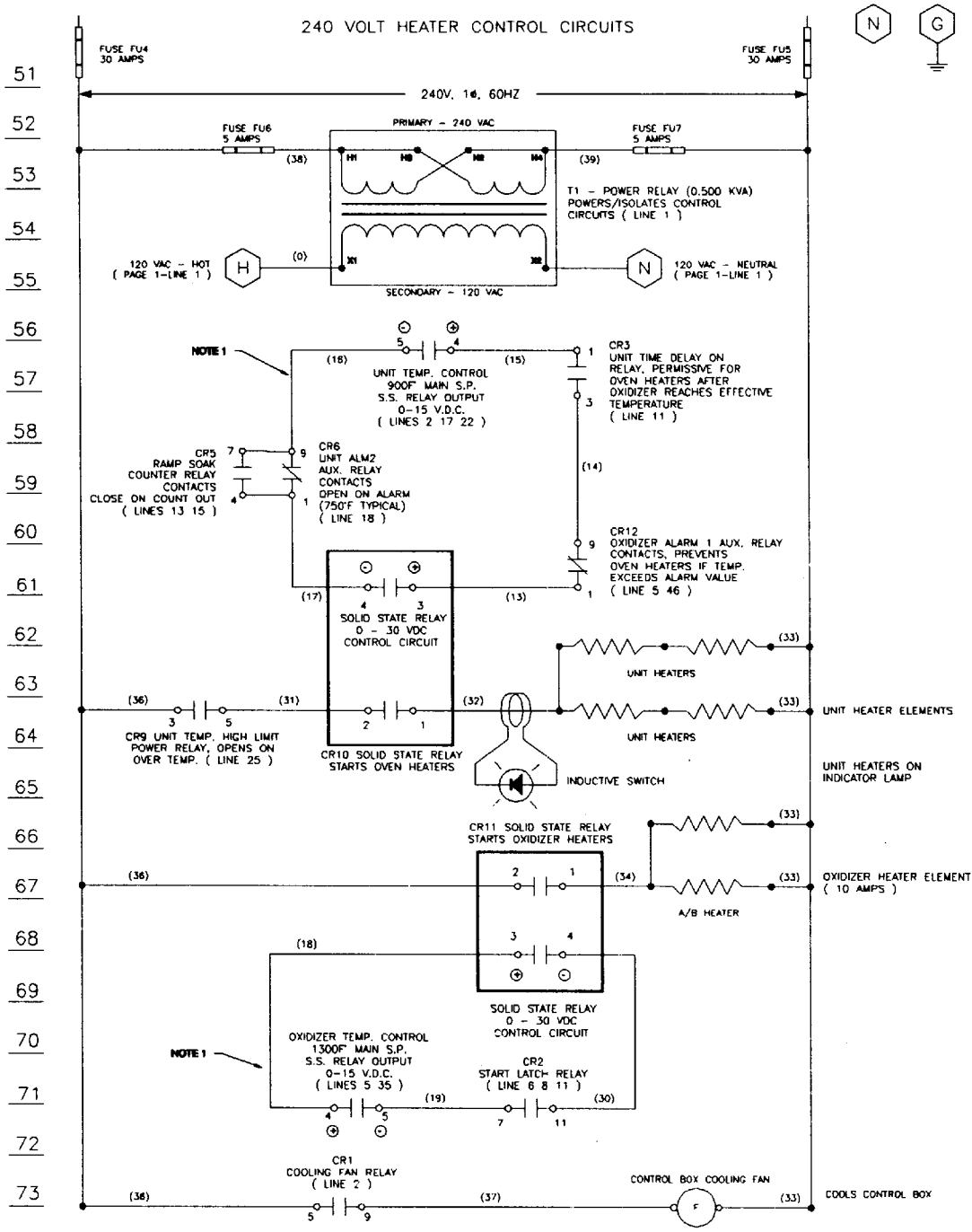
Figure 8:
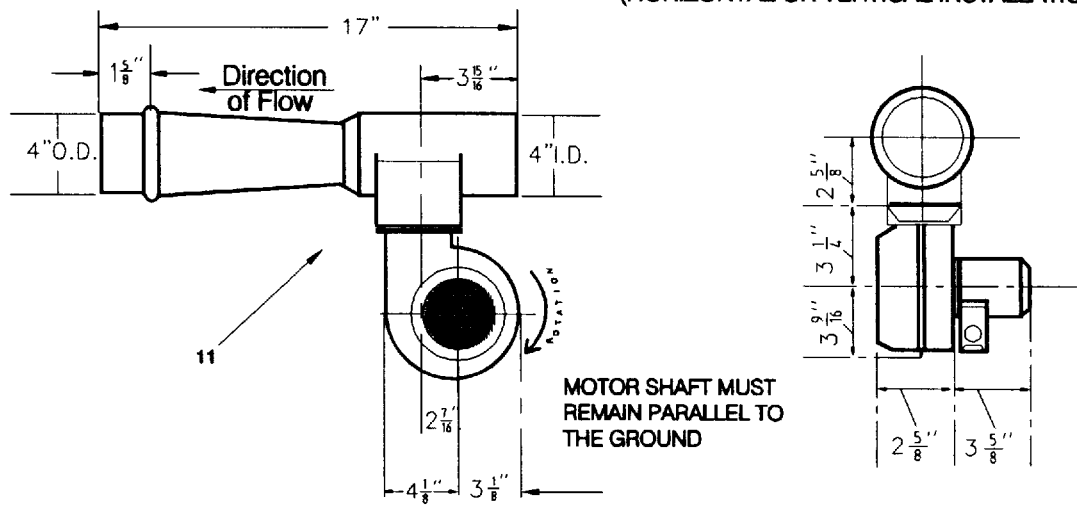
FIG. 8 is an illustration of the draft inducer 11, as commercial part QuickDraft Model Q-4.
Figure 9:
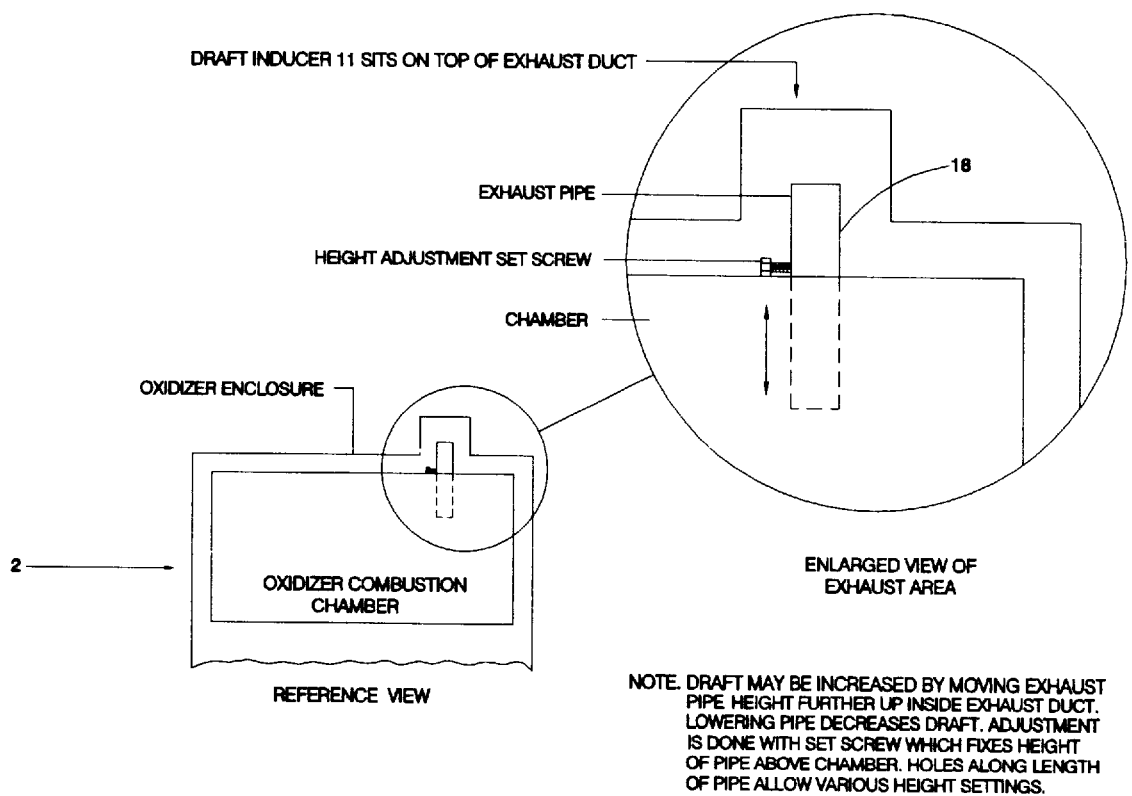
FIG. 9 is an illustration of means for increasing the unit's oxidizer draft by moving the exhaust pipe height further up inside the exhaust duct, and conversely decreasing the draft by lowering the pipe height.

DETAILED DESCRIPTION. Referring to FIGS. 1 and 2 of the drawings, the cleaning system of this invention comprises two separate, well-insulated, heated chambers, i.e. the pyrolysis chamber 1 which typically has internal usable dimensions of about 20 inches cubed, and the oxidizer (combustion) chamber 2 which is a circular chamber with inside dimensions about 5 inches in diameter and about 24 inches in length. The pyrolysis chamber 1 is heated with inconel, sheathed heater elements 3 and is typically operated at temperatures of 800 to 1000 degrees F., preferably at 900° for cleaning of most laboratory glassware or metal parts. It is fitted with a dual-gasketed front door 5 for easy loading and unloading of the objects to be cleaned. Shelves 6 hold the items to be cleaned. Alternatively, stainless steel baskets may be used to hold the parts being cleaned. A stainless steel drip pan 7 sits on the bottom of the chamber to collect molten organic matter which drips from the objects being cleaned during the cleaning process. This pan 7 catches and contains any molten material, preventing it from reaching the door gaskets where it may solidify, causing ripping of the door gasket after the oven has cooled down and the door 5 is opened to remove the cleaning items.

One or more of the oven trays 8 are constructed of perforated metal such that ceramic catalytic beads 49 are part of the tray design. These special trays 8 with catalytic beads 49 are a critical portion of the invention. The catalytic beads 49 serve to consume any initial oxygen present in the oven chamber 1 by catalyzing the oxidation reaction between pyrolysis smoke and gases produced during the initial heatup to cleaning temperature set-point. The catalyst agent used here is conventional, commercially available catalyst media well know to persons of ordinary skill in the chemical arts, comprising ceramic substrates coated with noble metals such as platinum and palladium, having the characteristic of catalytically accelerating the combination of oxygen with carbonaceous gases at temperatures above about 500° F. Thus, catalytic oxidation results in "self-inerting" of the oven chamber 1 as the oven temperature rises above about 600 degrees F. If sufficient amounts or organic residues are on the parts to be cleaned, then enough combustible gases will be produced to virtually consume all of the initial oxygen in the air, and likewise to consume any oxygen in any air which infiltrates the oven chamber 1 during the pyrolysis portion of the cleaning process, thus continuing to self-inert the oven chamber resulting in measured oxygen contents of below 1 to 2 percent. This low level of oxygen is very safe and is completely adequate to prevent any possibility of fires, explosions, or uncontrollable temperature excursions in the pyrolysis chamber while pyrolysis is occurring to vaporize off organic residues from the parts being cleaned.

The oxidizer chamber 2 is heated with nichrome heater elements 4 capable of producing temperatures of over 2000 degrees F. The oxidizer has an air inlet hole 9 to allow air to be pulled into the heater section of the oxidizer 10 where it is heated typically to 1300 to 1400 degrees F. The combustion air for the oxidizer is supplied primarily by an induced draft of about 0.05" water column from a draft inducer 11. The draft inducer 11 is typically a commercially available assembly such as QUICKDRAFT Model Q-4, and equivalent, available from the Quick Draft Corporation, a division of C. A. Litzler Company, Inc., Canton, Ohio 44708-9973. Because the pyrolysis chamber 1 and the oxidizer chamber 2 are connected by a pipe 12, both chambers operate at basically the same draft. The pyrolysis chamber 1 is designed to be tightly sealed, utilizing dual gasketing to achieve a tight seal and a low leakage rate of air into the chamber 1. This is an important feature of the overall design of this invention. If large amounts of air are pulled into the pyrolysis chamber 1, then ignitions and fires can still occur, even with the presence of catalytic media 49 inside the chamber 1. In contrast, the oxidizer chamber 2 includes an air inlet hole 9 to admit necessary air (oxygen) for complete combustion of smoke generated in the pyrolysis chamber 1 and fed to the oxidizer chamber 2 through the connecting pipe 12. The draft inducer 11 serves three important functions (in addition to the function of exhausting the effluent gases): (i) supplying the negative pressure (draft) for the oxidizer chamber 2 and pyrolysis chamber 1; (ii) cooling the hot oxidizer exhaust gases (1300 to 1600 degrees F.) to temperatures in the range of 150 to 200 degrees F. and exhausting them; and also (iii) supplying a flow of cooling air between the oven insulation 13 (and likewise oven insulation 16) and the outer metal skins or panels 14 of the oven console 50.

An important feature of the invention is the injection of a small amount of compressed air into the pipe 12 connecting the pyrolysis chamber 1 and the oxidizer chamber 2. Air is injected through small, ¼ inch stainless steel tubing 15 which is connected to a small air pump 48 (as referred to in FIG. 2, but not shown) in FIG. 2, or alternatively and equivalently to a compressed air source 48 (not shown) regulated to furnish the proper amount of air. Flow rates of between 20 and 40 SCFH of compressed air have been found to give good results. The air must be injected by means of tubing 15 into the pipe 12, parallel to and in the direction of flow from the pyrolysis chamber 1 to the oxidizer chamber 2. The air injection creates a small venturi and mixing effect in the pipe 12, effectively creating a small gas burner when sufficient amounts of pyrolysis smoke and gases exit the pipe 12 into the heated oxidizer chamber 2 in the presence of heated air. The amount of air injected by means of tubing 15 into the connecting pipe 12 is small (about 10 to 20 percent) compared to the major portion of the combustion air which is pulled into the air inlet hole 9 by the induced draft 11 under which the system operates. Experimentation has shown that this injected air is critical in achieving good mixing and turbulence in the oxidizer chamber 2, resulting in more complete combustion of the pyrolysis smoke and gases from the cleaning process.

Two distinct mechanisms have been observed for the destruction of VOC's (volatile organic compounds, also referred to herein as the pyrolysis smoke and gases) in the oxidizer chamber 2. During the initial stages of pyrolysis where relatively small amounts of VOC's are generated in the pyrolysis chamber 1 and enter the oxidizer chamber 2, the VOC's and air mix without a visible flame 45 from the exit of the connecting pipe 12. During this period, the ceramic, honeycomb catalyst 17 which is present as a barrier 17 through which the VOC's must pass in the oxidizer chambers 2, becomes visibly red and glowing, indicating much of the oxidation is occurring catalytically by the honeycomb catalyst 17. As the pyrolysis chamber continues to heatup and produces larger concentrations of VOC's, ignition or light-off of a visible flame 45 from the exit of the connection pipe 12 occurs, accompanied by an audible noise from the flame 45. The flame 45 visibly has many of the characteristics of a typical flame produced by a nozzle-mix burner, including the faint, audible noise of most gas flames. It appears that the majority of the burning/oxidation of the VOC's occurs in the flame 45 and its outer boundaries before reaching the honeycomb catalyst 17. As the temperature control system of this cleaning unit keeps the oxidizer chamber at its typical control point of about 1500 degrees F., the flame continues to burn and control of the pyrolysis smoke and gases (VOC's) appears to be dominated by this mechanism. As smoke evolution begins to cease, the gas concentration exiting the end of the connecting pipe 12 drops to a level that the flame "sputters" out over a period of several minutes. After falling to a level where a lighted flame cannot be maintained, oxidation of the last of the pyrolysis smoke and gases again appears to occur primarily on the honeycomb catalyst 17, evidenced by a rosy, red glow from the honeycomb catalyst 17. As all pyrolysis smoke dies away, the honeycomb catalyst 17 loses its rosy, red glow and appears darker. The heated area on the oxidizer chamber in front of the honeycomb catalyst 17 has a reddish glow from the electric heater elements, but the honeycomb catalyst 17 itself shows its "dark" appearance typical when no oxidation is occurring on the catalysts surface 17.

After the production of pyrolysis smoke and gases has ceased in the cleaning cycle, air injection by means of tubing 15 into the connecting pipe 12 is no longer critical or needed, i.e., there is no more smoke to burn. At this point, it is necessary to introduce air into the pyrolysis chamber to oxidize carbon, soot-like residues produced during the pyrolysis portion of the cleaning cycle. It has been found that the amount of air injected by tubing 15 into the connecting pipe 12 also works well for oxidizing the carbon residues created in the pyrolysis chamber 1. At the end of the pyrolysis portion of the cleaning cycle, a three-way solenoid valve 38 switches the air stream furnished by the air pump 48 from the tubing 15 connecting pipe 12 into the oxidizer chamber 2 to a oven air inlet pipe 47 connected to the pyrolysis chamber 1. After a timed period of oxidation at 800 to 1000 degrees F., the parts are free of carbon residues and the cleaning system automatically shuts down. The system cools down so the cleaned parts can be unloaded, and the controls reset, ready for another cleaning cycle.

AUTOMATIC CLEANING CYCLE

Automatic Cleaning Cycle. This oven cleaning apparatus and process is equipped with an automatic cycle time feature which adjusts itself to the load placed in the oven. The cleaning time is limited by the processing speed of the oxidizer. The more organic residues or polymers on the parts, the more smoke that will be evolved off the parts during the thermal cleaning process. The oxidizer is equipped with a temperature sensor and controller which monitors the amount of smoke evolved off the parts, and controls the heatup rate of the oven to prevent the oxidizer from being overwhelmed by too much smoke. The oxidizer control system will cut off the oven heaters if too much smoke is being produced. The oven temperature seeks whatever temperature is necessary to produce the maximum amount of smoke the oxidizer can process. Thus the oxidizer actually controls the heatup rate. When all the organic residue is pyrolyzed/vaporized off the parts, smoke evolution will fall off, allowing the oven temperature to climb to the normal processing temperature of 900 degrees to finish off the cleaning process. A cycle timer relay is located inside the control box, with an adjustable range of 0 to 10 hours. The factory setting of 2 hours is recommended for most applications.

QUANTITY OF CATALYST MATERIALS AND SOURCE

The oven assembly console of the preferred embodiment of this invention uses a commercial VOC catalyst in the pyrolysis chamber, in the form of catalytic beads, called PRO-PEL-VOC 1414, being ¼" aluminum spheres. The catalytic beads, or spheres, are of ceramic substrate having coating of 0.1% platinum as the nobel metal. The preferred embodiment uses between one to two pounds of said spheres in the pyrolysis chamber, i.e. one to two pounds of pellets per tray. This catalyst is available from regular commercial sources such as Prototech Company, 32 Fremont Street, Needham, Mass. 02194.

The preferred embodiment in the oxidizer chamber uses a honeycomb catalytic combuster made by the Corning Company. The honeycomb catalytic combuster is a ceramic substrate having a coating of noble metal. The preferred embodiment uses a honeycomb shape that is six inches in diameter by two inches thick, and has a honeycomb structure of 25 cells per square inch. On occasion, in the preferred embodiment, applicant has used two of these stacked together to get a four inch thickness. This catalyst is also of the platinum group metals, at levels in the range of 0.1% dispersed on the ceramic substrate which is designed to have a high surface area. The Corning Company is located in Haughton Park, Corning, New York 14831.

SEQUENCE OF EVENTS

To illustrate operation of this cleaning system and apparatus, the sequence of events which occurs during an empty, test cycle will first be enumerated, followed by a description of the events which occur in a typical cleaning cycle which produces significant amount of pyrolysis smoke and gases.

Before starting the cleaning cycle, the power switch 25 is turned on. This energizes both the oven temperature controller 21 and the oxidizer temperature controller 22, displaying both process setpoint and process temperatures for each chamber. When the momentary start button 24 is pressed, the cleaning cycle begins. The oxidizer heaters 4 come on and the oxidizer chamber 2 begins to heatup to its typical set-point of 1300 degrees F., and this rise in temperature is displayed on the oxidizer temperature controller 22. CR3 time delay relay 32 (30 minute setting) begins timing. The function of this relay 32 is to allow the oxidizer chamber 2 to heatup to process temperature before the pyrolysis (oven) chamber 1 begins heating. A door lock solenoid bolt 37 energizes, locking the pyrolysis chamber oven door 5. This is an important safety feature as it would be quite dangerous to open the pyrolysis chamber door 5 during smoke production, as a flash fire could occur. The draft inducer 11 is powered and amount of draft should be indicated on manometer 42. The optimum draft for the present invention is in the range of −0.02 to −0.10 inches water column (w.c.), preferably about −0.05 inches w.c. At the same time, the air pump 48 inside the system control box 40 is energized, and small air flow of about 20 to 40 SCFH is piped to the heater section 10 of the oxidizer chamber 2 through the normally open port of the three-way Solenoid Valve 38.

After CR3 relay 32 times out, typically a 30 to 45 minute delay, the oven chamber heaters 3 come on, and the oven chamber 1 heats up to a temperature below the normal oven process set-point of 900 degrees F., referred to as the soak cycle temperature cycle temperature. The soak cycle, or alternately preliminary soak cycle, temperature is typically set at between 775 and 825 degrees F., and is adjustable by setting Alm 2 31 of the Oven Temp Controller 21 as a deviation alarm of minus 125 degrees F. With an Oven set point of 900 degrees F., the oven chamber 1 will heat to 775 degrees F.; alm 2 light 31 will come on; and the oven chamber heaters 3 will shut off. The oven temperature will control at 775 degrees F. by the on/off action of Alm 2 31 of the oven chamber temperature controller 21. The on/off pulses of 110 volts register as a counter on the 0–99 Counter relay 30, which is typically set to between 5 and 10 counts.

After the Counter relay 30 counts out, its relay contacts close, bypassing the contacts of Alm 2 31 of the Oven temp controller 21. The oven heaters 3 will stay on even though Alm 2 light 31 is on. This occurrence signals the end of operation at the soak (preliminary soak) cycle temperature, and the oven chamber 1 will heat up to its normal set point of 900 degrees F.

An automatic timing sequence starts when oven chamber 1 temperature reaches within 10 degrees F. of main set point. Alm 1 21 of Oven temp controller 21 is set at plus/minus 10 degrees F., and is activated at 890 degrees F. Alm 1 21 contacts power CR8 relay 33 which is set for 30 minute time delay. As long as oven temperature controls at plus/minus 10 degrees of main set point, CR8 33 will continue to time. After timing out, it starts the main cycle timer relay, CR7 27. Typical settings for this relay 27 are 2 hours to remove most organic contaminants. Asphalt residues are more difficult to remove and typically take 4–5 hours for complete cleaning.

When the main cycle timer 27 starts, the 3-Way solenoid valve 38 is powered, switching the air flow from the Air Pump 48 to the oxidizer chamber 2 to inside the oven chamber 1. This promotes oxidation of carbon residues produced during the pyrolysis portion of the process, and completes the two step pyrolysis-oxidation cleaning process.

The oven chamber 1 continues to operate at 900 degrees F. for the timed period on CR7 27. After this relay 27 times out, the cleaning system of this invention shuts down. The oven and oxidizer heaters 3 and 4 are cut off, the air pump 48 is shut off, and the oven chamber 1 begins to cool down. The contacts of CR4 29 (time delay Off relay) remain powered shut for 80 minutes to keep the Draft Inducer running and aid in cool-down.

When the oven chamber 1 temperature drops below 890 degrees F. (Alm 1 21 setting of the Oven temp controller 21), the timers 27 & 33 reset and the counter relay 30 resets. After cool down, the unit is ready for another cleaning cycle.

To illustrate the operation of the present invention during a typical cleaning cycle where the system is loaded with objects which produce significant amounts of pyrolysis smoke and gases, the following description applies.

SEQUENCE OF EVENTS DURING ACTUAL CLEANING CYCLE WITH PARTS WHICH PRODUCE SMOKE

If sufficient smoke is produced during the cleaning cycle, burning of the smoke inside the oxidizer chamber 2 will cause its temperature to rise above its normal setpoint of 1300 degrees F. Alm 1 35 of the oxidizer temp controller 22 is set as a high deviation alarm of 200 degrees F. If smoke production raises the oxidizer chamber 2 temperature to 1500 degrees F., Alm 1 35 contacts will open, cutting off the oven heaters 3. This will cool the oven chamber 1 and reduce the amount of smoke production being fed from the oven chamber 1 to the oxidizer chamber 2.

Oven temperature will automatically equilibrate or seek whatever oven tmeperature it takes to produce enough smoke to keep the oxidizer temperature at 1,500° F.

Nearly always, smoke production occurs below the oven set point of 900 degrees F., and it is quite common for oven to process at about 725 to 825 degrees F., producing enough smoke to keep the oxidizer chamber 2 at the controlling temp of 1,500 degrees F. When smoke production in the primary, oven chamber 1 dies away, the oxidizer chamber 2 temp will fall back down to its normal control setting of 1,300 degrees F. When this happens, then control of the process switches back to the Oven temp. controller 21. It is normal for the process to be controlled first by the Oven temp. controller 21, switch over to control by the oxidizer temp controller 22 during smoke production phase of the cleaning cycle, and then back to control by the Oven temp controller 21 after smoke evolution is essentially complete.

Alm 2 36 of the oxidizer temp controller 22 is set at a high deviation alarm of 50 degrees F. As long as sufficient smoke is being produced inside the oven chamber 1 to keep the oxidizer chamber 2 temp about 1,350 degrees F. (Alm 2 31 setting), then CR8 33 and CR7 27 timing relays cannot run, preventing the timing sequence from starting. In practice, this circuitry acts as a form of "smoke detector", preventing the timing sequence or the injection of air into the oven chamber 1 until all smoke production has ended. Air injection and start of the Main Cycle timer 27 can begin only when the Oven chamber 1 temperature is within plus/minus 10 degrees of its 900 F. set-point AND oxidizer chamber 2 temperature is below Alm 2 36 setting of the oxidizer temperature controller 22 (1350 degrees F.). Numerous experiments with the system have shown that under the above two conditions, the pyrolysis chamber 1 will be free of combustible smoke and gases, and safe to introduce air into the pyrolysis chamber 1. As the pyrolysis portion of the cleaning cycle ends, smoke production dies away, the oven chamber 1 temperature will again be controlled by the oven temp controller 21, not the oxidizer temp controller 22. The oven chamber 1 temperature will then continue to rise to set-point and begin the timing sequence. If sufficient smoke was generated at temperatures below the soak cycle temperature to keep the oven chamber temp depressed, then the oven chamber temperature will control at the soak cycle temperature until the counter relay 30 counts out, and then will rise up to the set point of 900 degrees, starting the timing circuitry.

PRINCIPLES OF OPERATION AND USE

For disclosure purposes, the following paragraphs are here repeated from the Installation, Operation, Maintenance Instructions, written by the applicant herein for the cleaning process of this invention, as follows.

HOW IT WORKS:
1. Heat Decomposes and Vaporizes Organic Residues from the Glass or Metal Parts:

This oven is basically a high-temperature oven capable of operating at 900 degrees F. This temperature is sufficient to thermally decompose (vaporize) most polymeric residues and other organic material to volatile gases and carbonized residues without harming the glass or metal parts. The pyrolysis smoke and gases produced by degradation of the organic residues reacts with a catalyst suspended in stainless steel wire mesh which comprise the bottom of the two racks (trays) inside the oven chamber. If sufficient smoke or pyrolysis gases are produced inside the oven, the catalytic oxidation of this smoke in the oven will consume oxygen inside the oven and actually inert the oven to a very low oxygen level of one to two percent, and keep it there.

2. Pyrolysis Smoke and Gases are Consumed by Electric/Catalytic Oxidizer (Afterburner):

Any unreacted pyrolysis products formed inside the oven exit through a pipe at the top of the oven and pass through the small oxidizer chamber which sits on top of the oven. The oxidizer is a combination electric/catalytic system which preheats the oven exhaust gases to 1200–1300 degrees F. with excess air before they pass through a honeycomb ceramic catalyst which completes any oxidation not occurring in the preheat zone of the chamber. This pollution control method is very effective at destroying any smoke and odor produced during the cleaning process. The cooled exhaust gases from the afterburner chamber are free of smoke and odor, resulting in a pollution-free cleaning process.

3. Final Cleaning is Accomplished by Oxidation Stage:

The heat-cleaning process actually consists of two distinct stages. The first stage is the pyrolysis stage described above. The second stage consists of oxidation of any carbonized residues produced during the first, pyrolysis stage. Virtually all organic materials produce some soot-like, carbon residues on thermal decomposition. Maintaining the oven at 900 degrees F. for additional time results in oxidation of any carbon residues, leaving the glassware or metal parts completely free of any organic matter.

ADVANTAGES:

The cleaning process of this invention has significant advantages over older, historical methods of cleaning laboratory glassware. Because cleaning is done entirely with heat, the use of solvents, chemicals, and laborious hand brushing can be eliminated. This results in increased safety and eliminates solvent or chemical costs. The significant problems of waste disposal tracking and costs are likewise eliminated. The cleaning process is completely automated and essentially labor free. Once the oven is loaded and the cleaning cycle started, the unit can be left unattended. Breakage of glassware is greatly reduced because manual handling is greatly reduced. Discarding of difficult-to-clean glassware is eliminated because glassware that is too difficult or too expensive to clean can be economically cleaned in this oven. For example, crosslinked polymers are often completely insoluble in any solvent or chemical cleaning agent. An example is crosslinked polyethylene. Yet this material is easily removed in this oven, preventing the glassware from being thrown away.

OPERATING CONTROLS

The major operating controls and their use are described in the following paragraphs.

1. "Oven Heater On" and "Cycle Started" Lights.

The orange indicating light comes on when the "Start Cycle" button is depressed, visually indicates that the cleaning cycle has begun. The door should not be opened while the cleaning cycle is in progress. To prevent this, a solenoid style electric door lock is powered, locking the door. The small, red light labelled "Oven Heater On" indicates when the oven heaters are powered. After the oven has reached cleaning temperature and run for the dialed amount of time set on the Cycle Timer, the cleaning cycle will end. The red, heater light will go off, the "Cycle Started" light will go off, the electric door lock de-energizes, and the oven will begin to cool down. The exhaust blower will continue to run for about 80 minutes to help remove the heat in the oven and afterburner chambers. The cool-down time is adjustable from a relay inside the main control box and can be increased if desired.

2. Oven Temperature Controller

A digital, indicating temperature controller displays both the oven set-point and the actual cleaning temperature as the oven heats up and carries out the thermal cleaning process. The normal cleaning temperature of 900 degrees F. is adequate for virtually all organic residues and should not normally be changed. The controller alarm contacts (alarm 1) are configured as a deviation alarm, closing at minus 10 degrees below the set-point (890 F. for a set-point of 900 F.). The alarm contacts activate a time delay relay (set for 30 minute delay) which energizes the Cycle Timer, ensuring that the chosen cycle time is a true "time at temperature". The Manufacturer's instruction manual for the temperature controllers is included in this manual for reference. The Factory configuration for both the oven and the Oxidizer controllers are also documented on a single page (for each controller) for simplicity and is found in the Trouble-Shooting section of this manual.

3. Afterburner (Oxidizer) Temperature Controller

For ovens equipped with an oxidizer for destruction of the smoke created during the cleaning in process, an afterburner temperature controller is furnished. It controls the temperature of the Oxidizer chamber. Typical set-point of this controller is 1300 degrees F. An alarm setting of 100 to 200 degrees above the setpoint is used to detect excessive smoke evolution from the oven chamber and shut off the oven heaters. For example, a typical setting of 200 degrees F. deviation alarm for the afterburner controller would shut off the oven heaters if the afterburner temperature exceeds 1500 degrees F. Thus the afterburner controller actually limits the oven temperature to the permissible level of smoke evolution from the oven. If the amount of plastic or organic residue on the glass or metal parts is very small and smoke evolution never exceeds the maximum temperature of the afterburner controller, then the oven heat-up rate is not affected by the oxidizer controller.

4. Cycle Timer.

A 0 to 10 hour Cycle Timer Relay located inside the oven control box allows the time at process temperature to be selected. Typical settings are 2 to 4 hours for most parts. For materials which form larger amounts of carbon residues during pyrolysis, longer times may be required. For safety reasons, never set the Cycle Timer at less than 1 hour. This is to ensure that the oven never shuts down before all smoke from the thermal cleaning is gone.

For removing asphalt residues, the typical cycle timer setting is 4 to 5 hours.

5. Ramp/Soak Feature.

This oven is equipped with a special feature which allows the oven temperature to be brought up to a temperature below the actual set-point, and held for a time at that temperature, before proceeding to the set-point temperature. As an example, the oven can go to 800 degrees F., hold for 30 minutes, then proceed up to its set-point of 900 degrees F. This feature is similar to what a controller equipped for ramp control can do, yet the controller is not equipped for true ramp control. In effect, a single ramp and hold feature can be configured using Alm 2 of the oven. temperature controller and a Counter relay, which can be set for 0–99 counts. Before describing the electrical operation of this circuit, let us describe the purpose of this feature.

Experience has shown that if the oven is allowed to proceed to setpoint, it can sometimes over power the afterburner with smoke, resulting in an overshoot and poor control. By allowing the oven to reach temperatures between 800 and 850 F., and holding for 15 to 30 minutes, the oven temperature and smoke control is smoothed out, resulting in virtually no overshoot of the afterburner temperature. The Factory default "soak" temperature is 825 F. with a Counter Relay setting of 10 counts. (This corresponds to a setting of −75 degrees for the Alm2 of the oven controller). Five counts translates to about 30 minute soak cycle. After the soak temp and time are over, the oven proceeds up to set-point with virtually no overshoot of the afterburner controller.

Electrical Description of the Soak/Ramp Feature:

By setting Alm 2 of the oven temperature controller at minus 75, then these contacts will open at 825 degrees F. and shut off the heater elements. Each time the Alm 2 contacts open and close, a Counter Relay counts these pulses. When the pulses reach the total set on the counter, the Counter Relay contacts close and bypass the Alm2 contacts which keep the oven from reaching above the value of the Alm2 setting. Therefore the oven temperature reaches 825 degrees F. and maintains this temperature until the Counter Relay counts out and bypasses the Alm2 contacts. Then the oven heaters can come back on and bring the oven temperature up to set-point. By changing the value of Alm2 setting, you can change the soak temperature. For example if the setpoint is 900 F. and Alm 2 is minus 150, then the soak temp is 750. For an alarm setting of minus 100, the soak setting is 800 F. (100 degrees below the set-point of 900 F.). The default Factory setting for Alm 2 of the Oven controller is minus 75, which is a soak temp of 825 when the process setpoint is 900 degrees F. By changing the number of counts on the Counter Relay, the actual time at Soak temperature can be changed. The more counts, the longer time the oven temp remains at the Soak temp. The number of counts required to maintain the oven temperature at its Soak temp must be determined experimentally and will vary from oven to oven somewhat. Typically, 10 counts on the Counter Relay translates into about 30 minutes of soak time.

6. "Start Cycle" Switch.

Momentarily depressing the "Start Cycle" switch begins the cleaning process. The orange, indicating light, "Cycle Started", lights and remains on until the Cycle Timer times out and shuts down the cleaning process. The oven door should not be opened until the oven has cooled down to below about 500–600 degrees F.

7. "Stop/Reset" Button.

This button ends the cleaning cycle, shutting off the afterburner and oven heaters, but allows the exhaust fan to continue to run for about 80 minutes to allow the system to cool down. In normal operation, this control should not be used. Once the cleaning cycle has started, it is best to let the oven proceed completely automatically through its cleaning process. The stop button can safely be used to end the cycle only if you are certain no smoke is present inside the oven chamber.

Do not use the "Stop/Reset" button to terminate a cleaning cycle after the oven heaters have come on. At this point, some smoke or pyrolysis gases may be present in the oven and it would not be safe to open the door. Avoid the temptation to "add more metal parts" in the middle of the cleaning cycle. If the metal parts are not put in the oven at the beginning of the cycle, then leave it for the next run!

8. Power Switch.

The main power toggle switch activates the 120 volt control circuit and energizes the temperature controllers. After a few seconds, both the set-point and the oven temperature should be displayed. The top display reads oven temperature, the lower display shows the set-point (900 F. normally). For the Afterburner (Oxidizer) controller, the normal set-point is 1300 degrees F.

9. Over-Temperature Protection.

If the oven temperature should go over 1050 degrees F., an independent High-Limit Temperature switch will open and kill power to the oven heaters. The switch is located inside the main control box and is the manual reset type. Once the switch trips open, it must be manually reset by shorting the two reset terminals momentarily.

10. Pressure Relief

This oven has a spring-loaded pressure relief panel on the top of the oven, located under the top metal skin. If a pressure build-up occurs, this panel will open, releasing the pressure, and then close back again, keeping out air or oxygen to the oven. This panel is loosely stuffed with insulation which will blow out to release any sudden, violent pressure, and may be replaced thereafter.

11. Sampling Port

A sampling port is located on the front cover of the Oxidizer chamber cover. It is covered with small plastic tip to seal it when not in use. This port is used for measuring the negative draft pressure in the oven to ensure it is vented properly. The oven pressure should always be slightly negative, preferably −0.04 inches water column, with limits of from −0.02 to −0.06 inches water column. Refer to the Installation section for details on achieving the correct oven negative pressure.

CAUTION: The oven must operate with the proper draft or it will not work properly and may create an unsafe condition.

How to Adjust the Oven Draft. Once the unit is installed and vented, the oven draft should be measured. If the draft is not within proper limits, then it must be adjusted. Oven draft is achieved by the venturi effect of air sucked around the Oxidizer exhaust pipe. The Draft Inducer suction pulls air past and around the stainless steel exhaust pipe.

To increase oven draft, the height of the exhaust pipe is increased.

To lower oven draft, the height of the exhaust pipe is decreased.

Changing the height of the pipe out of the Oxidizer chamber is done by positioning a screw in the side of the pipe. The pipe has 5 or 6 holes drilled in it to allow adjustment of the pipe height outside the chamber. The entire pipe can be pulled out of the Oxidizer chamber (with pliers if the pipe is hot), the screw repositioned to raise or lower the pipe height. The Draft Inducer must be removed from the top of the unit so you can reach down inside the exhaust duct with pliers to remove the pipe. The Draft Inducer must be replaced and restarted to measure the oven draft after any change of the pipe height.

If the oven pressure is positive instead of slightly negative, these pyrolysis gases may escape into the room and smoke or odor will be observed. If the oven pressure is too highly negative, then excessive air is sucked through the oven (even though it is tightly sealed). This excessive leakage rate can prevent the oven from reaching its normal set-point (or struggle to reach its set-point) and/or ignition of any combustible, pyrolysis gases may occur because of the high oxygen level caused by excessive draft and leakage.

REFERENCE TO APPLICANT'S "INSTALLATION, OPERATION AND MAINTENANCE MANUAL"

This applicant has written an "Installation, Operation and Maintenance Manual", dated FEBRUARY 1996 for the oven cleaning process and apparatus of this invention. The Manual is listed and a copy furnished with the Information Disclosure Statement filed herewith, including Form PTO-1449, whereupon applicant hereby respectfully refers to said Manual.

PREMISE AND DEFINITIONS

In this application, the following definitions have been used.

pyrolysis—chemical decomposition brought about by the action of heat, in this instance at a temperature and within an environment containing percentage of oxygen content insufficient at that temperature to start or support combustion.

combustion—act or instance of burning—a chemical process accompanied by the evolution of light and heat, commonly the union of the substances with oxygen, resulting in and accompanied by fire.

burn—To be on fire—to give forth light and heat during combustion to undergo combustion.

ignite—to subject to fire—to heat strongly above the temperature of combustion to the point of manifesting light and heat, especially flame—to render luminous by heat.

catalyst—a substance which is involved in and accelerates a chemical reaction which may be recovered practically unchanged at the end of the reaction.

catalysis—acceleration of a chemical reaction by presence of a catalyst.

catalyze—to subject to catalysis.

oxidize—to combine with oxygen.

volatile—capacity for volatizing or volatization.

volatize—to pass off, or to cause to pass off, into a vapor or gaseous state at temperatures, in this instance below the temperature of combustion.

In this disclosure, the term, pyrolysis, is used in the sense as chemical decomposition by the action of heat, but generally in the absence of oxygen, or in presence of only very low percentage content of oxygen, insufficient at that temperature to permit ignition or support combustion.

The term, combustion, is used as the act or instance of burning as a rapid chemical process accompanied by the evolution of light and heat, involving the union of substances with oxygen, resulting in, and accompanied by, fire.

The catalyst as used in this invention is a ceramic substrate having a coating of noble metal such as platinum, or palladium, or a mixture of those, and the like, having the characteristic of catalytically accelerating the combination of oxygen and smoke at elevated temperatures, which is well known in the chemical arts and may be obtained commercially.

The honeycomb catalyst in the oxidizer in this invention is of substantially the same catalyst material described above, and is commercially available in the shape of a honeycomb panel, used as a porous wall or barrier, placed across a cross section of the oxidizer chamber in such a manner that smoke and other gases emanating from the burner in the oxidizer, after leaving the burner, must pass, and are drawn by the draft from the draft inducer, through the openings in the honeycomb. The honeycomb catalyst blocks the exit of gases from the oxidizer, wherein said gases pass through and are exposed to the catalyst.

The term self-inerting, in this invention, means the self capability of the apparatus and process of this invention to remove, and to continue removing, oxygen from the atmosphere within the oven chamber to a level which will not support oxidization at the regulated temperatures of said chamber.

EQUIVALENT ARRANGEMENTS AND ALTERNATIVES COVERED HEREIN

It will be understood that this invention is not limited to the embodiments specifically disclosed here, but is equally capable of other equivalent arrangements, rearrangements, embodiments, modifications, and substitutions of parts and elements, equivalently to achieve the functions, means, ways and results disclosed herein, without departing from the spirit and teaching of the invention, and are intended to be covered within this disclosure and claims of this invention.

I claim:

1. Apparatus for thermal cleaning of organic (contaminates) contaminants from fragile parts by pyrolysis in a self-inerting atmosphere, said self-inerting atmosphere not supporting combustion, and by oxidization below the temperature of combustion for said contaminants, with means for removing smoke and fumes from effluent gases, said apparatus comprising:

a. a first chamber with an atmosphere within said chamber; said atmosphere comprising oxygen; a second chamber communicating with said first chamber; means for substantially sealing said first chamber against inflow of air; means for controlling the temperature of said first chamber and maintaining said temperature of said first chamber at a controlled temperature below said temperature of combustion and within a range of about 800 to 1000 degrees F.; means for moving gases out of said first chamber and into said second chamber;

b. means for self-inerting said atmosphere within said first chamber at said controlled temperature, said self-inerting atmosphere not supporting combustion;

c. means for pyrolytically decomposing said organic contaminants in said self-inerting atmosphere at said controlled temperature into:
   carbonized residue; and
   gases;

d. means for oxidizing said carbonized residue in said first chamber into gases and ashes at said controlled temperature;

e. means in said second chamber for burning and catalytically oxidizing smoke and fumes from said gases moved from said first chamber and into said second chamber; and f. means for exhausting said gases moved from said first chamber and into said second chamber after said burning and oxidizing.

2. Apparatus according to claim 1 wherein said means for self-inerting said atmosphere further comprises means for self-maintaining said oxygen of said atmosphere in said first chamber at a low level which will not support combustion of said contaminants in said first chamber at said controlled temperature during said pyrolysis decomposing.

3. Apparatus according to claim 1 wherein said means for self-inerting said atmosphere comprises:
   (a). catalyst medium located within said first chamber for accelerating combination of said oxygen with said pyrolysis gases in said first chamber;
   (b). said combination of said oxygen with said pyrolysis gases reducing said oxygen in said first chamber to a level which will not support combustion in said atmosphere at said controlled temperature;
   (c). said oxygen in said atmosphere being reduced to a level which will not support combustion during initial heat-up of said chamber to said controlled temperature, and during said pyrolytically decomposing at said controlled temperature.

4. Apparatus in accord with claim 1, further comprising:
   catalyst medium for accelerating oxidization in said second chamber; and
   means for injecting compressed air into said first chamber.

5. A thermal process for cleaning organic contaminants from fragile parts by pyrolysis in a self-inerting atmosphere, said self-inerting atmosphere not supporting combustion, and by oxidization at below the temperature of combustion for said contaminants, said process comprising the following steps:
   providing an apparatus for thermally cleaning said parts, comprising: a cleaning chamber with an atmosphere within said chamber; said atmosphere in said chamber comprising oxygen; means for substantially sealing said cleaning chamber against inflow of air; means for controlling the temperature of said chamber and maintaining said temperature of said cleaning chamber at a controlled temperature below said temperature of combustion and within a range of about 800 to 1000 degrees F.; means for substantially sealing said chamber against inflow of air; catalyst means for accelerating combination of said oxygen in said atmosphere with any pyrolysis gases in said chamber; means for moving gases out of said cleaning chamber; means for determining when all said pyrolysis gases have been removed from said chamber; and means for injecting compressed air into said cleaning chamber;
   placing into said chamber said fragile parts containing said organic contaminants to be cleaned from said parts;
   substantially sealing said chamber against inflow of air;
   controller and maintaining said sealed chamber at said controlled temperature for a period of time
   allowing said organic contaminants in said chamber to begin pyrolytically decomposing into pyrolysis gases, and allowing said pyrolysis gases to begin catalytically combining with said oxygen in said chamber;
   during said pyrolytic decomposing, allowing said atmosphere in said chamber to catalytically self-inert, said self-inerting atmosphere not supporting combustion at said controlled temperature;
   during said self-inerting of said atmosphere, allowing said organic contaminants in said chamber to continue pyrolytically decomposing in said self-inerting atmosphere at said controlled temperature into: carbonized residue; and pyrolysis gases;
   during said pyrolytically decomposing, moving said pyrolysis gases from said chamber;
   determining when all of said pyrolysis gases have been removed from said chamber;
   after all of said pyrolysis gases have been removed, and while continuing to maintain said chamber at said controlled temperature, injecting compressed air into said chamber, oxidizing said carbonized residue in said chamber into oxidized gases and ashes at said controlled temperatures; and
   during said oxidizing, moving said oxidized gases from said chamber.

6. Process according to claim 5 wherein said apparatus for cleaning further comprises: catalyst medium located within said chamber for accelerating the combination of oxygen from any air within said sealed chamber, and from any air which may be drawn into said chamber, with any pyrolysis gases generated in said chamber.

7. Process according to claim 5 further comprising said oxygen in said atmosphere in said chamber being reduced to a low level below about 2%.

8. Process according to claim 5 further comprising steps as follows:
   providing a combustion chamber communicating with said cleaning chamber, said combustion chamber further comprising means in said combustion chamber for cleaning combustible smoke and fumes from effluent gases from said cleaning chamber by burning and catalytic oxidizing;
   during said pyrolytically decomposing, and during said oxidizing in said combustion chamber, moving said pyrolysis gases and said oxidized gases from said cleaning chamber and into said combustion chamber;
   in said combustion chamber cleaning said combustible smoke and fumes from said pyrolysis gases and said oxidized gases from said cleaning chamber by said burning and catalytic oxidizing; and
   removing said gases from said combustion chamber after said burning and catalytic oxidizing, and exhausting them.

9. In an electrically heated cleaning chamber which cleans organic contaminants from fragile parts by pyrolysis and by oxidization at below the temperature of combustion for said contaminants, a process for achieving and maintaining self-inertness of the atmosphere in said cleaning chamber during said pyrolysis, said cleaning chamber preventing fires, explosions, and difficult-to-control temperature variations, said process comprising the following steps:
   a. providing an apparatus comprising: a cleaning chamber with an atmosphere within said chamber; said atmosphere comprising oxygen; means for substantially sealing said cleaning chamber against inflow of air; and means for controlling the temperature of said cleaning chamber and maintaining said temperature of said first chamber at a controlled temperature below said temperature of combustion and within a range of about 800 to 1000 degrees F.;
   b. incorporating into said cleaning chamber means for self-inerting said atmosphere within said cleaning chamber at said controlled temperature, said self-inerting atmosphere not supporting combustion:
   c. incorporating catalytic media in said cleaning chamber which accelerates consumption of said oxygen initially present in said atmosphere and in any air which may infiltrate said chamber;

d. placing said parts to be cleaned into said cleaning chamber; and substantially sealing said chamber against inflow of air;

e. controlling, and maintaining the temperature of said atmosphere containing said parts to be cleaned in said cleaning chamber at said controlled temperature;

f. pyrolytically decomposing said organic contaminants to be cleaned from said parts into carbonized residue and gases containing pyrolysis smoke and fumes;

g. during said pyrolytic decomposing, allowing said atmosphere in said cleaning chamber to accomplish said self-inerting, said self-inerting atmosphere not supporting combustion at said controlled temperatures, said self-inerting of said atmosphere being accomplished by allowing said oxygen initially present in said atmosphere in said chamber and in said any air infiltrate said chamber to catalytically combine with said pyrolysis smoke and fumes produced in said cleaning chamber during said decomposing;

h. moving said pyrolysis gases from said cleaning chamber;

i. using instrumentation well known in the art, determining when said decomposing into said pyrolysis smoke and gases has ceased and all said pyrolysis smoke and gases have been moved from said cleaning chamber;

j. after said decomposing into said pyrolysis smoke and gases has ceased, and while continuing to maintain said cleaning chamber at said controlled temperatures, injecting compressed air into said cleaning chamber, oxidizing said carbonized residue into gases and ashes at said controlled temperature, thereby completing said cleaning process.

10. A process according to claim 9 further comprising steps as follows:

providing a combustion chamber communicating with said cleaning chamber; said combustion chamber comprising means in said combustion chamber for removing, by burning and catalytic oxidizing, said pyrolysis smoke and fumes from said gases produced in said cleaning chamber;

during said pyrolytic decomposing in said cleaning chamber and during said oxidization in said cleaning chamber, moving said gases from said cleaning chamber and into said combustion chamber;

removing said pyrolysis smoke and fumes from said gases in said combustion chamber by said burning and catalytic oxidizing; and exhausting said gases from said combustion chamber after said burning and catalytic oxidizing.

* * * * *